United States Patent [19]

Trigg

[11] Patent Number: 6,121,616
[45] Date of Patent: Sep. 19, 2000

[54] COMBINED INFRARED AND VISIBLE LIGHT SPECTROSCOPIC PHOTOMISSION MICROSCOPE

[75] Inventor: Alastair Trigg, Singapore, Singapore

[73] Assignee: Institute of Microelectronics, Singapore, Singapore

[21] Appl. No.: 09/090,073

[22] Filed: Jun. 3, 1998

[30] Foreign Application Priority Data

Oct. 3, 1997 [SG] Singapore ............................ 9703648-7

[51] Int. Cl.[7] ...................................................... G01J 3/44
[52] U.S. Cl. ................................ 250/339.07; 250/339.02; 250/339.05; 250/339.12; 250/332; 356/303; 359/368
[58] Field of Search ............................. 250/339.02, 332, 250/339.05, 339.07, 339.12, 347, 349, 353, 311; 356/303; 359/368

[56] References Cited

U.S. PATENT DOCUMENTS 4,877,960 10/1989 Messerschmidt et al. .
5,512,749 4/1996 Iddan ........................................ 250/332
5,581,085 12/1996 Reffner et al. .
5,841,139 11/1998 Sostek ................................. 250/339.12

FOREIGN PATENT DOCUMENTS

2299402 10/1996 United Kingdom .

*Primary Examiner*—Constantine Hannaher
*Assistant Examiner*—Otilia Gabor
*Attorney, Agent, or Firm*—Proskauer Rose LLP

[57] ABSTRACT

A microscope for detecting a portion of the electromagnetic spectrum of a sample image and producing an output signal in response thereto. The output signal may be stored for later reference or an image related to the output signal may be displayed by an image capture and storage system. The microscope may be provided with both an infrared and a visible spectra detector. A rotatable image director having a reflecting surface directs the sample image to an image detector. The microscope may have image detectors such as a CCD camera and a spectrometer. The image detectors of the microscope share a common optical path up to the image director.

18 Claims, 6 Drawing Sheets

COMBINED INFRARED AND VISIBLE LIGHT SPECTROSCOPIC PHOTOMISSION MICROSCOPE

FIELD OF THE INVENTION

This invention relates generally to a method and apparatus for imaging a sample. More particularly, this invention relates to a spectroscopic microscope for detecting an electromagnetic spectrum of a sample image.

BACKGROUND OF THE INVENTION

In the field of imaging microscopy, various imaging techniques are known. For instance, it is known that an infrared (IR) detector can be used for imaging a sample based on its IR emissions. The IR emissions from the sample are focused on an IR sensitive detector. The IR detector produces an electrical signal which is proportional to the amount of IR emissions received.

In visible light microscopy, light in the visible spectra is reflected from a sample through a focusing lens and is received either directly by a person looking through the focusing lens or is received by a receptor such as a charge coupled device ("CCD"). The CCD produces an output signal that can be used for displaying a received image or recording the received image for future reference.

Often it is desirable to view different portions of the electromagnetic spectrum of a sample image. For instance, it may be desirable to view both the IR and visible light portions of the sample image. Yet, in many prior art systems, two separate microscopes may be required. One microscope may be required for viewing the IR image and another microscope may be required for viewing the visible light image.

Other prior art systems, such as disclosed in U.S. Pat. No. 5,512,749, to Iddan ("the Iddan Patent"), combine both an IR detector and a visible light detector into one microscope yet may direct the IR image and the visible light image using different light paths. In the Iddan Patent, if an IR detector is selected, a mirror is used to direct the IR image to an IR image path. The IR image path terminates at an IR detector which is mounted in a a dewar assembly for maintaining a cryogenic environment. Yet, if the visible light detector is selected, the mirror is flipped out of the optical path and the light is directed through a conventional visible light microscope. This unnecessarily complicates the setup procedure when switching from one detecting system to the other. For instance, the change in the light path in the prior art systems introduces problems with the focus of the sample when switching between the two detectors.

Often the different light paths of the detectors in the prior art also cause problems with the alignment of the sample when switching between the two detectors. The alignment problem is such that the sample must be repositioned each time a switch is made from one detector to the other.

In addition, it may also be desirable to detect the sample image using more than one IR detector and one visible light detector.

Therefore, it is an object of the present invention to provide a microscope that is capable of detecting both an IR and visible spectra for producing a corresponding image.

Another object of the present invention is to provide a microscope that can receive both an IR and visible spectra and produce a corresponding image without needing a complicated realignment and readjustment procedure when switching between detectors.

A further object of the present invention is to provide a microscopy system that is capable of providing several different detector options.

A still further object of the present invention is to provide a microscopy system that can readily be switched from one detector option to another.

SUMMARY OF THE INVENTION

These and other objects of the present invention are achieved by a combined IR and visible light spectroscopic microscope of the present invention. A preferred embodiment of the present invention comprises a microscope having an image director. The image director receives a sample image and directs it to one of a plurality of image detectors. The sample image has a common optical path up to the image director regardless of which image detector is selected. One of the plurality of image detectors may comprise an IR detector. Another one of the plurality of image detectors may comprise a visible image detector or an ultraviolet detector.

In a preferred embodiment of the present invention, the microscope may have a motorized positioner for providing x, y, z, and θ sample positioning. The microscope preferably has a system controller for controlling the sample positioner and other systems of the microscope (discussed in more detail below).

In a preferred microscope, a sample image travels over an optical path wherein the sample image is first magnified by an objective lens assembly. The objective lens assembly may comprise various lenses having different magnifications and/or different transmission qualities for optimizing the transmission of the sample image. Next in the optical path of the sample image is a half-silvered mirror and an illuminator which together illuminate the sample and produce a good quality sample image.

The sample image then passes through a filter wheel and an optical chopper. The filter wheel has several different filters which can be selected by rotating the desired filter into the path of the sample image. The different filters on the filter wheel have different transmission characteristics. The filter wheel is primarily used for selecting the wavelength of the sample image which is received by the detector. The filter selection may be controlled by the system controller.

The chopper of the present invention helps produce a high signal to noise ratio of the sample image by using a lock-in amplification system that is known in the art. The chopper may also be controlled by the system controller.

The placement of the filter wheel and optical chopper prior to the image director and within the common optical path of the sample image enables the use of the same filter wheel and optical chopper regardless of which detector is selected. This reduces the complexity of the present inventive microscope while still providing the option of utilizing the filter wheel and optical chopper with any selected detector. The placement of the filter wheel and optical chopper within the common optical path also simplifies the setup procedure required when switching from one detector to another. The number of optical surfaces may remain constant when switching from one detector to another and therefore there is no image shift introduced that may require correcting the focus or the placement of the sample image.

Next in the optical path of the sample image is an image director which has a reflecting surface that directs the sample image onto a selected detector. The image director may be controlled by a stepper motor, a direct gear drive system or any other control system that is known in the art.

In the inventive microscope of the present invention, image detectors are arranged around the image director. The image director can direct the sample image to any of the image detectors by aiming the reflective surface of the image director towards the selected image detector. The reflective surface of the image director may be aimed, for instance, by rotating the image director. The orientation of the image director may be controlled by the system controller. This inventive method of directing the sample image simplifies the optical path of the sample image and ensures that the microscope of the present invention can easily be switched from one detector to another without requiring a complex setup procedure.

The use of the image director also enables use of the common optical path up to the image director regardless of which detector is selected. This eliminates the need to reposition the sample each time a different detector is selected. The optical path of the sample image may be the same length regardless of which detector is selected. This may eliminate the need to refocus the sample image when switching between detectors.

In the inventive microscope of the present invention, the image director can also be used to scan the sample image over a selected detector such as an imaging spectrometer. This may eliminate the need for an additional scanning apparatus when a two-dimensional spectroscopic sample image is desired. In this embodiment, the image director is used to scan the sample image across an input slit of the spectrometer.

In an alternate embodiment, a conventional spectrometer can be used to produce a two-dimensional image by selecting an aperture length for the spectrometer that is shorter than the input slit of the spectrometer. Thereafter, the sample image may be scanned across the input aperture in two-directions that are orthogonal to each other. The two-dimensional scanning may preferably be accomplished in a novel way by first rotating the image director in one direction and then tilting the image director to provide scanning in the orthogonal direction.

In the present inventive microscope, several different image detectors may be selectable. For example, a charge coupled device ("CCD") camera may be used for conventional microscopy imaging; a spectrometer may be used for spectral imaging; an image intensifier camera may be used for visible imaging at low light levels; and a cooled cadmium mercury telluride ("MCT") array may be used for infrared imaging. Other imaging systems that are known in the art may also be used with the microscope of the present invention.

The output of the selected image detector may be directed to a capture and storage system such as a magnetic storage medium, an optical storage medium, etc. The capture and storage system may also contain an output device such as an image monitor or a printing device for easy reference.

The combined infrared and visible light spectroscopic microscope of the present invention enables analysis of both visible and IR sample images without the need to move the sample from one imaging system to another.

The microscope of the present invention also utilizes a common optical path that minimizes the number of optical surfaces such as lenses that reflect or transmit the sample image. Minimizing the number of optical surfaces provides maximum flexibility in terms of wavelength range and minimizes losses through absorption and scattering of the sample image. The common optical path also makes the microscope of the present invention relatively easy to setup when switching from one detector to another.

The system controller of the present inventive microscope may also account for the different focal lengths of the various objective lenses by automatically adjusting the lens assembly to focus the sample image for a selected lens.

BRIEF DESCRIPTION OF THE DRAWINGS

Following is a description of a preferred embodiment of the present invention which when taken in connection with the following drawings, illustrates the above-noted features and the advantages as well as further ones. It should be expressly understood that the drawings are included for illustrative purposes and do not represent the scope of the present invention.

DETAILED DESCRIPTION OF THE INVENTION

In the drawings, like reference numerals are used to designate like parts.

Figure 1:
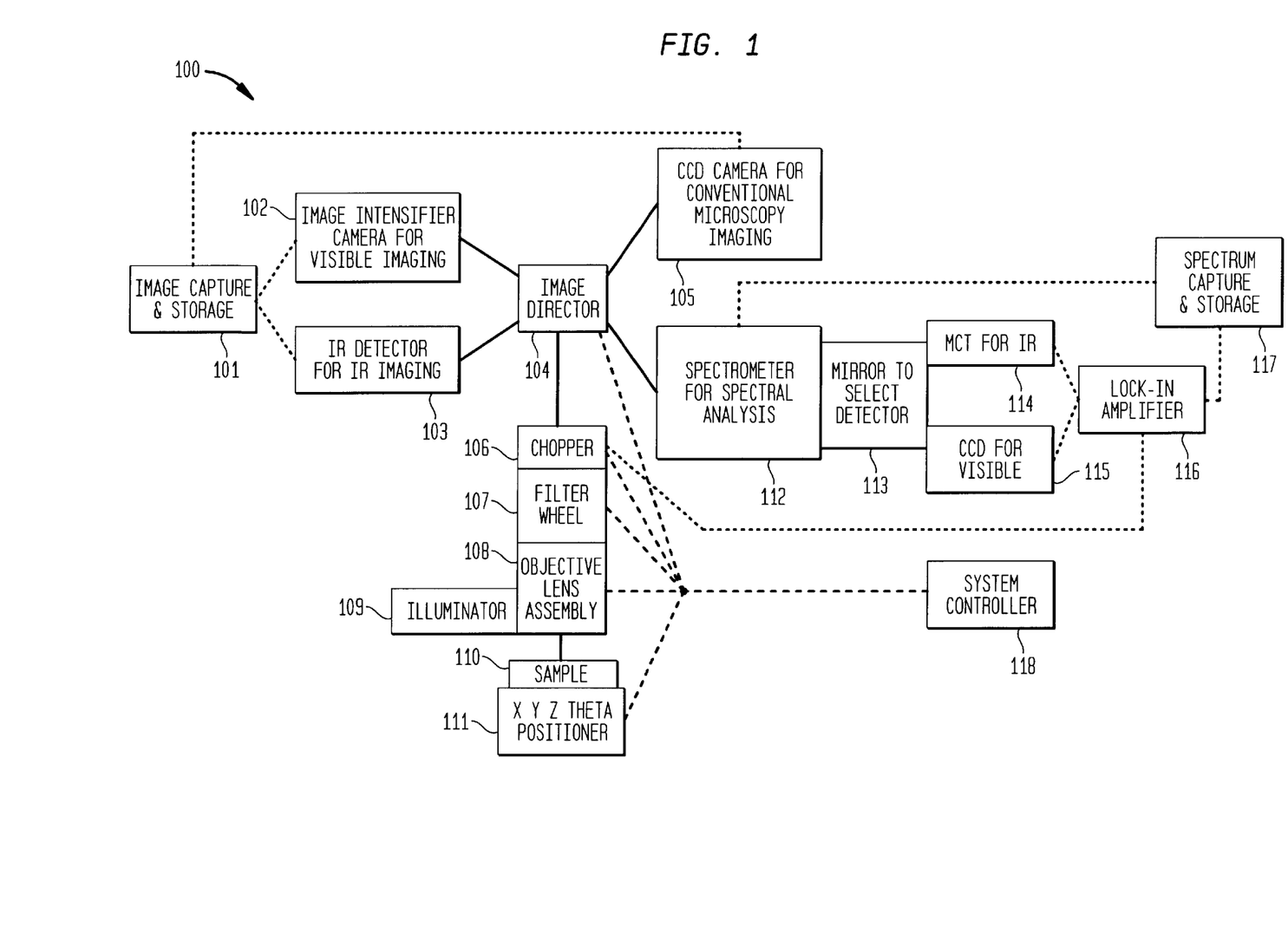
FIG. 1 is a block diagram of a preferred embodiment of the present invention.

FIG. 1 shows a block diagram of a preferred microscope 100 in accordance with the present invention. A sample 110 is shown mounted on an x, y, z, and θ motorized sample positioner 111. There are many available options for providing x, y, z, and θ sample positioning. For example, a suitable configuration is available from Oriel, comprised of an x and y movement, Model No. 16178; a z movement, Model No. 16628; a θ movement, Model No. 13138; and a controller, Model No. 18011. The sample 110 produces a sample image which may be enhanced by an illuminator 109. The sample image is received by an image director 104 through an objective lens assembly 108, a filter wheel 107, and a chopper 106. The image director 104 directs the sample image to one of a group of image detectors such as a charge coupled device ("CCD") camera 105, a spectrometer 112, a image intensifier camera 102 and an infrared ("IR") image detector 103.

The sample image has a common image path between the sample and the image director regardless of which image detector is selected. Since the image path of the sample image is the same for any selected detector, there is no image shift introduced when switching from one detector to another. Therefore, the image does not need to be repositioned each time a different detector is selected. The use of the common image path also may eliminate the need to refocus the sample image each time a different detector is selected since the optical path of the sample image can readily be the same length for each detector. This simplifies the setup procedure required when switching from one detector to the other.

An image capture and storage system 101 may receive an output signal from the selected detector, such as the charge coupled device ("CCD") camera 105, the image intensifier camera 102 or the IR image detector 103. A spectrum capture and storage system may receive an output signal from the spectrometer 112 when the spectrometer 112 is selected to receive the sample image.

The spectrometer 112 may comprise a mirror 113 that may direct the sample image to either an IR detector 114 or a CCD detector 115. An output signal that is produced when the sample image is received by either the IR detector 114 or the CCD detector 115, may be received by a lock-in amplifier 116. The lock-in amplifier 116 may transmit the output signal to a spectrum capture and storage system 117.

A system controller 118 may control various systems of the microscope 100 including the sample positioner 111, the objective lens assembly 108, the filter wheel 107, the chopper 106, and the image director 104. Each of these systems may also illustratively be manually controlled.

Figure 2:
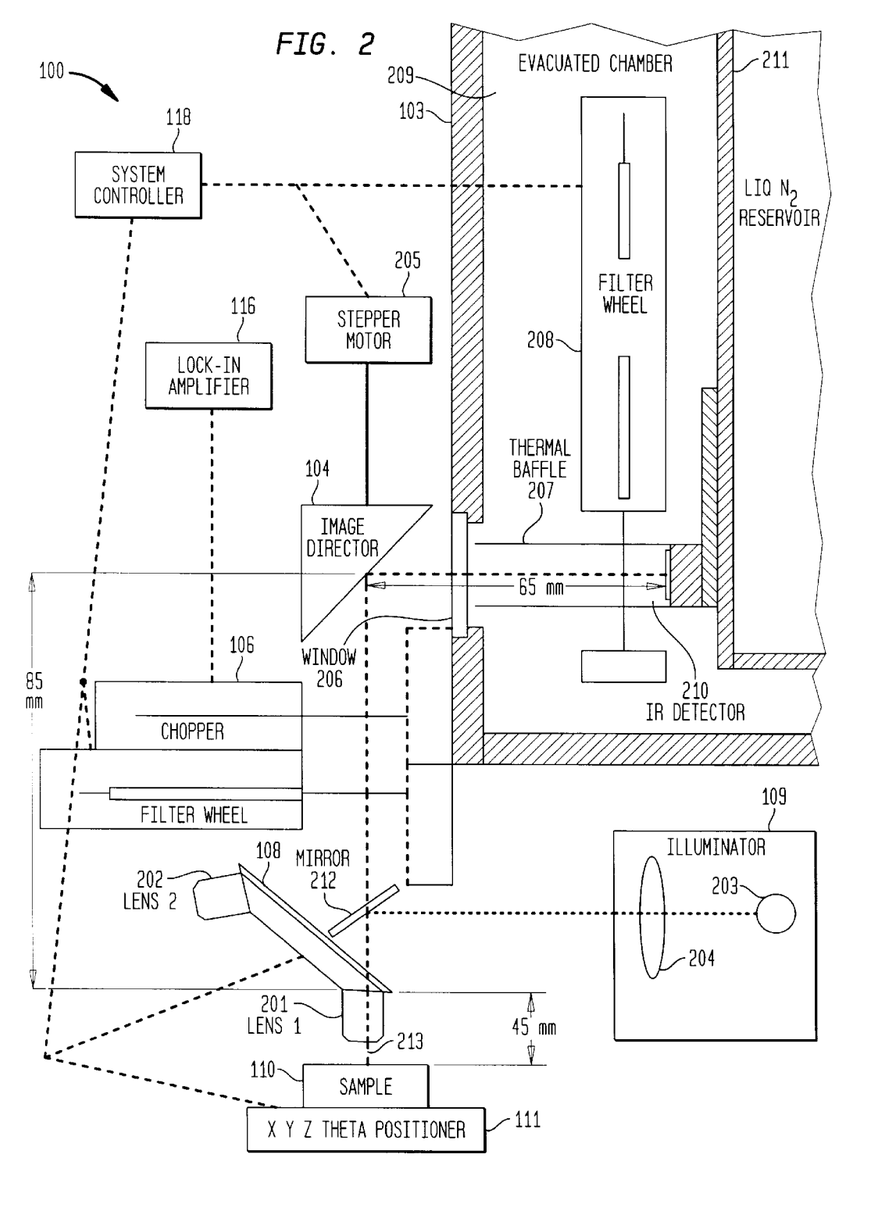
FIG. 2 is a cross-sectional view of a preferred microscope showing one exemplary image detector and an exemplary optical path for a sample image.

FIG. 2 shows a cross-sectional view of a preferred embodiment of a portion of the microscope 100. The sample 110 is shown mounted on the sample positioner 111. Also shown is an exemplary optical path 213 for a sample image received by an infrared ("IR") image detector 103.

Referring to FIG. 2, one or more lenses, such as an objective lens 201 and an objective lens 202, may be affixed to a nosepiece of the objective lens assembly 108. The objective lens assembly 108 may be affixed to the microscope 100. The objective lenses 201 and 202 may be affixed to the nosepiece using objective mounts (not shown) such as standard Royal Microscopical Society (RMS) mounts.

A lens, such as objective lens 201, may be selected to transmit the sample image. The lens selection may be made using a motorized lens mount and the system controller 118. Further uses for the system controller 118 are discussed in more detail below.

Typically, standard objective lenses are constructed to have a distance of about 45 mm from the lens mount to a sample surface. This is the parfocalizing distance. Long working distance (LWD), near infrared (NIR) and reflecting lenses for the mid-infrared may have different, usually longer, parfocalizing distances. Therefore, the up and down adjustment (e.g., the Z range) of the sample positioner 111 should preferably be adequate to accommodate these non-standard lenses.

For ease of use, the sample positioner 111 may be driven to predetermined positions so that the sample 110 may be easily brought into focus when switching between lenses that have different parfocalizing distances. For instance, the system controller 118 may automatically sense a lens selection and appropriately adjust the sample positioner 111 to compensate for the different parfocalizing distance of the different lenses.

In a conventional microscope, the distance from the objective lens mount to an eyepiece locating surface is called the tube length. By convention, the primary image plane (e.g., the location where an image is formed and where an image detector may be placed) is 10 mm before the eyepiece locating surface. Most objective lenses are corrected either for a finite tube length of about 160 mm or for an "infinite" tube length. Having a lens corrected for an infinite tube length means that the light which is projected from the lens is neither converging nor diverging. In other words, the light rays that leave the lens are parallel to each other. Therefore, there is no focal point for the projected image.

Microscopes which use compound lenses that are corrected for an infinite tube length may require an additional tube lens (not shown). In this case, the additional tube lens is used to form an image on the image detector. The advantage of this is that since the light coming from the objective lens is parallel, the actual tube length may be selected to any convenient length. The disadvantage of using a lens that projects parallel light rays is that the additional lens required to form the image for the image detector may limit the capability of the microscope to the near infrared.

A central feature of the microscope of the present invention is that the number of optical surfaces such as lenses in the image path of the sample image is kept to a minimum. This provides maximum flexibility in terms of the wavelength range of the microscope and yet minimizes losses through absorption and scattering.

In the illustrative embodiment shown, a retractable half-silvered mirror 212 is positioned immediately above the objective lens (e.g., objective lens 201). The retractable half-silvered mirror 212, together with an illuminator 109, provide through-the-lens illumination. Through-the-lens illumination renders a good quality optical image even at high magnifications. Through-the-lens illumination also aids in navigating around complex samples such as integrated circuits ("ICs") and simplifies the location of desired portions of the sample.

As shown in FIG. 2, the illuminator 109 may comprise an illumination source 203 and an illuminator lens 204. The illuminator lens 204 directs the illumination from the illumination source 203 onto the half-silvered mirror 212. The half-silvered mirror 212 directs the illumination onto the sample. The half-silvered mirror 212 may be retracted when an IR detector is selected since illumination is not required for IR detection. Further, retracting the half-silvered mirror when an IR detector is selected, removes an obstruction from the optical path.

Figure 5:
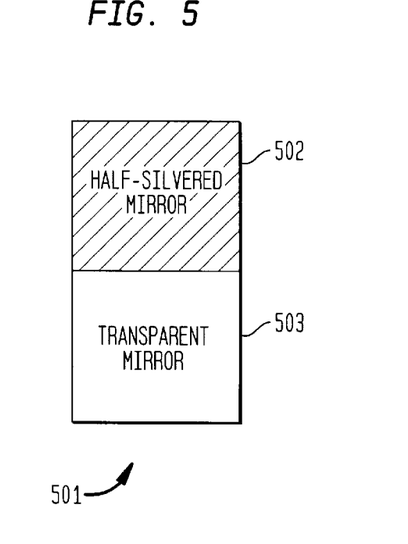
FIG. 5 is a view of an embodiment of a half-silvered mirror.

FIG. 5 shows a partially half-silvered mirror 501 which may replace the retractable half-silvered mirror 212 in an alternate embodiment. The mirror 501 may have a half-silvered first portion 502 and a transparent, non-reflecting second portion 503. The second portion 503 may be comprised of plane glass or another transparent medium.

In this alternate embodiment, instead of completely retracting the mirror 501, the mirror 501 is movable between at least two different positions. In a first position, the half-silvered first portion 502 is placed in the optical path of the sample image. In a second position, the transparent second portion 503 is placed in the optical path of the sample image. The first position of the mirror 501 may be selected when a visible image detector is selected so that the illuminator 109 can be used. The second position of the mirror 501 may be selected when an IR detector is selected to minimize the interference that the mirror 501 has on the sample image.

Using this alternate embodiment may simplify the mechanism required for positioning the mirror 501 since the mirror 501 does not need to be fully retracted out of the optical path. An added advantage of this embodiment is that the sample image travels through the same thickness of glass (or other transparent medium) regardless of the positioning of the mirror 501. Therefore, there need be no image or focus shift when the mirror 501 is moved from the first position 502 to the second position 503. The disadvantage of this embodiment is that when the IR detector is selected, some of the IR radiation making up the sample image may be absorbed by the mirror 501.

Returning to the illustrative embodiment shown in FIG. 2, above the half-silvered mirror 212 is the filter wheel 107 and the optical chopper 106. The filter wheel 107 and the optical chopper 106 are placed in the optical path prior to the image director 104. Consequently, the filter wheel 107 and the optical chopper 106 are within the common optical path of the sample image. This configuration enables the use of the same filter wheel 107 and optical chopper 106 regardless of the detector selected. This configuration reduces the complexity of the present inventive microscope while still providing the flexibility of utilizing the filter wheel 107 and optical chopper 106 if desired.

The placement of the filter wheel 107 and the optical chopper 106 within the common optical path also simplifies the setup procedure that may be required when switching from one detector to another. Additionally, when switching from one detector to another, the number of optical surfaces may remain constant due to this configuration. Consequently, there may be no image shift introduced when switching between detectors. An image shift may require correcting the focus or the placement of the sample image.

The filter wheel may have several different filters that may be selected by rotating the desired filter into the path of the sample image. The filter selection may be made based on the detector selected to receive the sample image. The filter wheel 107 may select wavelength ranges of the sample image in the visible and near infrared spectrum.

The filter wheel 107 may be controllable by the system controller 118 and may be similar in construction to filter wheels that are used in conventional IR and photoemission microscopes.

The chopper 106 provides a better signal to noise ratio of the sample image by using a lock-in amplifier 116 in a conventional way. In the conventional way, the sample image may be modulated at a predetermined frequency by the chopper 106. The predetermined frequency of the chopper 106 may be controllable by the system controller 118 or may be controllable directly. A reference signal from the chopper 106 enables the lock-in amplifier 116 to amplify the modulated sample image. Other frequencies that may be received due to noise, such as extraneous light leaks, are not amplified. Hence, the sample image signal is amplified and the noise signal is not, thereby improving the signal to noise ratio of the sample image.

The chopper 106 may be any commercially available type. Suitable choppers are available from several manufacturers, such as Oriel, Model No. 75157; Ealing, Model No. 28-7615; Ciraseby, Model No. 762; and Spex, Model No. CH117. An alternate embodiment of the present invention may reverse the positions of the chopper 106 and the filter wheel 107.

Above the chopper 106 is the image director 104. The image director 104 has a reflecting surface 214 that directs the sample image onto a chosen detector such as the IR image detector 103. By using the image director 104, a common optical path may be provided for all detectors up to this point. This makes it relatively easy to align and focus the sample image and ensures that the sample 110 remains properly positioned when switching from one detector to another.

The image director 104 may be a rotatable front silvered mirror. The rotational positioning of the image director 104 affects the relative alignment of the sample image obtained from each detector. Therefore, the rotational positioning of the image director may be controlled by the system controller 118. The system controller 118 may control a rotational system, such as a direct drive stepper motor 205, to correctly position the image director 104. A direct drive stepper motor, such as an Ealing Five Phase Decidrive, provides an angular resolution of 0.072°. This corresponds to a lateral resolution of about 0.08 mm at the focal plane or less than 1% of the sample image width.

In an alternate embodiment, a gear drive (not shown) may be placed between the stepper motor 205 and the image director 104. The use of a stepper motor and gear drive to position the image director 104 provides an angular accuracy of about 0.02°. This corresponds to a lateral resolution of about 0.02 mm or about 0.2% of the image width.

As shown in FIG. 2, the image detector that receives the sample image from the image director 104 may illustratively be the IR image detector 103. The IR Image detector 103 (discussed in more detail below) may illustratively be comprised of a window 206, a thermal baffle 207, a filter wheel 208, an IR detector array 210 and a liquid nitrogen reservoir 211. In a preferred embodiment of the present invention, the thermal baffle 207, the filter wheel 208 and the IR detector array 210 are housed within an evacuated chamber 209.

In a preferred embodiment of the present invention, the IR detecting array 210 may be arranged about 150 mm from the objective lens mount and about 65 mm from the axis of the objective lens.

Figure 3:
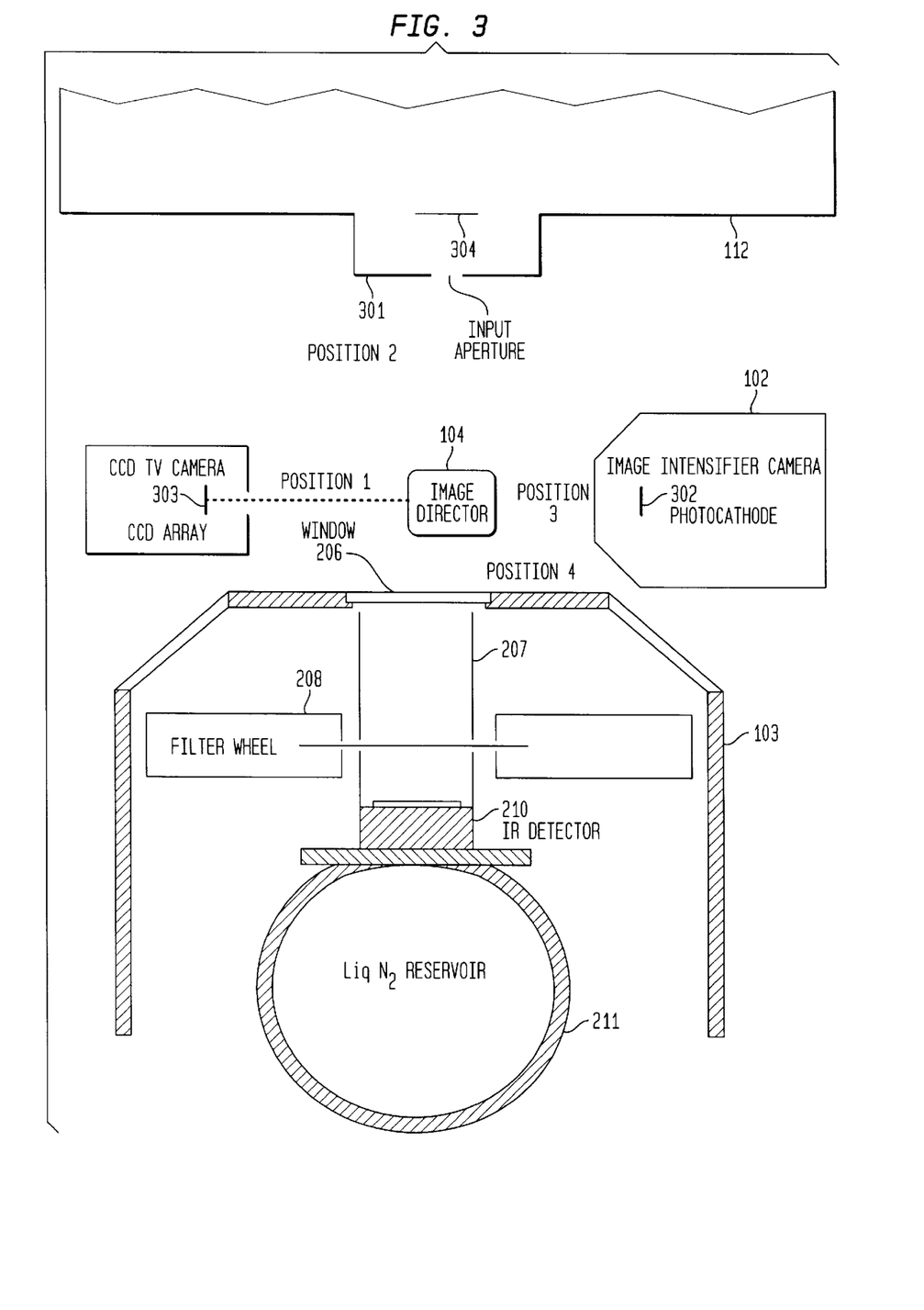
FIG. 3 an overhead cross-sectional view of a microscope, looking down on a preferred group of detectors.

FIG. 3 is an overhead, sectional view of an embodiment of the present invention wherein the image director 104 can illustratively be rotated to four positions. In FIG. 3, the image director 104 is shown in position 1, thereby directing the sample image to the CCD television camera 105. In position 2, the image director 104 may direct the sample image to the spectrometer 112. In position 3, the image director 104 may direct the sample image to the image intensifier camera 102. In position 4, the image director 104 may direct the sample image to the IR image detector 103.

In this embodiment, the color CCD camera 105 may be used for conventional imaging microscopy. The color CCD camera 105 may have a CCD array 303 for detecting the sample image. As shown in FIG. 1, an output signal from the color CCD camera 105 may be transmitted to the image capture and storage system 101. The image capture and storage system 101 may contain magnetic, optical, or other memory devices for storing the sample image. Further, the image capture and storage system 101 may also contain a viewing system such as a monitor or printing device for viewing the sample image.

The spectrometer 112 may be used for spectral analysis of the sample image. One particular form of a spectrometer is a monochromator. A monochromator is used to analyze a narrow portion of the sample image spectrum. If it is desired, both a standard spectrometer and a monochromator may be selectable in the present invention.

As shown in FIG. 1, the spectrometer 112 may be fitted with two detectors. One detector of the spectrometer 112 may be a photomultiplier tube ("PMT", not shown) or a CCD detector 115 for detecting the visible spectrum of the sample image. Another detector of the spectrometer 112 may be a cadmium mercury telluride (MCT) IR detector 114 for detecting the IR spectrum of the sample image. When using an MCT IR detector, the detector may be cooled. An illustrative embodiment of an IR detector is discussed in more detail below with reference to the IR detector array 210.

The desired detector (e.g., PMT, CCD or MCT IR detector) may be selected by a mirror 113 that may be internal or external to the spectrometer. The selected detector may produce an output signal that may be received by the lock-in amplifier 116. In a preferred embodiment of the present invention, the lock-in amplifier 116 amplifies the sample image signal and transmits the amplified sample image signal to the spectrum capture and storage system 117 for storage. The spectrum capture and storage system 117 may contain magnetic, optical, or other memory devices for storing a signal that represents the received sample image spectrum. The capture and storage system 117 may also contain a viewing system such as a monitor or printing device for viewing the received sample image spectrum.

As shown in FIG. 3, an input aperture 301 of the spectrometer 112 may be placed in the focal plane of the sample image. A detector 304 receives the sample image spectrum and produces an output signal. A spectrometer, such as a Spex Minimate Oriel 1/8m Spectrometer, is a high throughput, low resolution spectrometer with a variable slit width. To define the area of the sample from which the spectrum is obtained, a conventional input slit aperture may be replaced with an aperture that is about 1 mm square. The square aperture is then aligned with the area of interest of the sample image.

When the detector 304 is a linear array detector, a vertical line image of the sample may be obtained. This type of spectrometer is called an imaging spectrometer. An imaging spectrometer forms a one-dimensional horizontal spectrum of the sample image. The linear array detector may, for example, comprise a CCD detector or an MCT IR detector. As shown in FIG. 1, in a preferred embodiment, either of the detectors (e.g., a CCD detector and an MCT IR detector) may be selectable by means of a mirror, such as the mirror 113. An Oriel MS257 is an example of a spectrometer that has a built-in mirror for selecting between a CCD detector and an MCT IR detector. The Oriel MS257 offers a vertical resolution of about 40 $\mu$m, which is less than 1% of the image height.

Figure 4A:
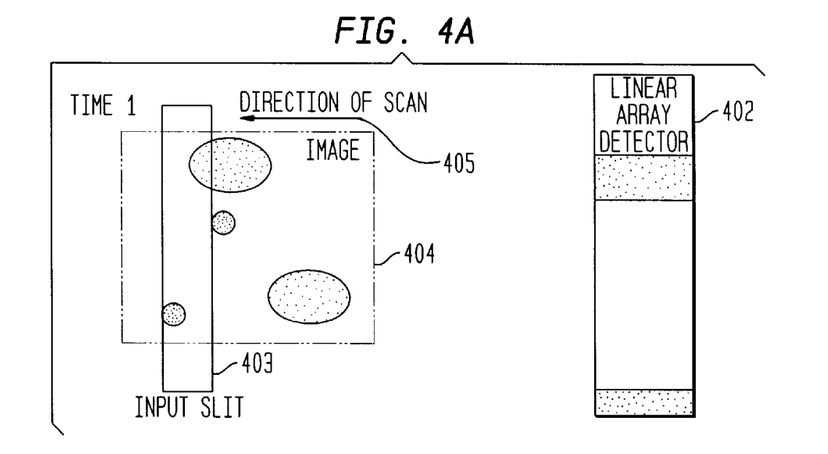
FIGS. 4A–4C are novel scanning spectrometer images, in accordance with an embodiment of the present invention, during three consecutive time periods.
Figure 4B:
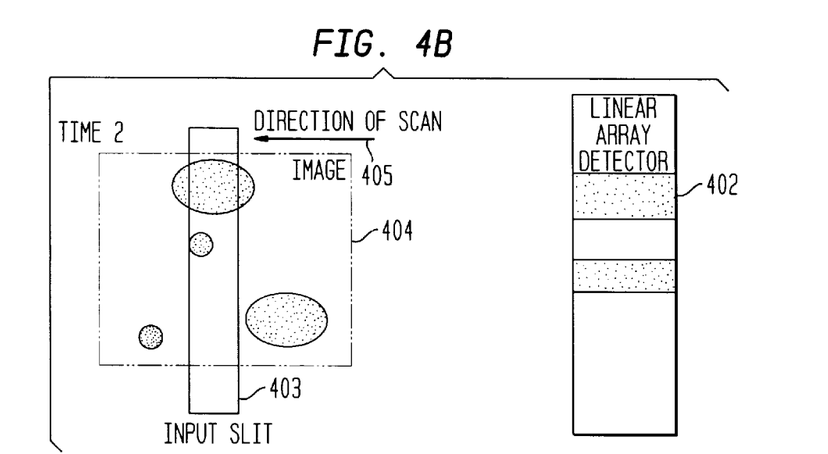
Figure 4C:
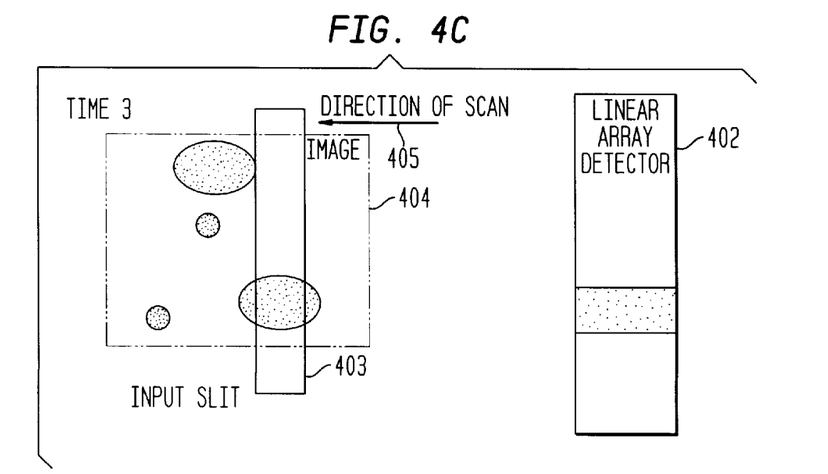

FIGS. 4A through 4C show examples of a line image that may be formed at a linear array detector 402 by novelly aligning an area of a sample image 404 with an input slit 403. A two-dimensional image may be obtained by scanning the sample image 404 across the input slit 403 in a direction 405, such as indicated in FIGS. 4A–4C.

Figure 7:
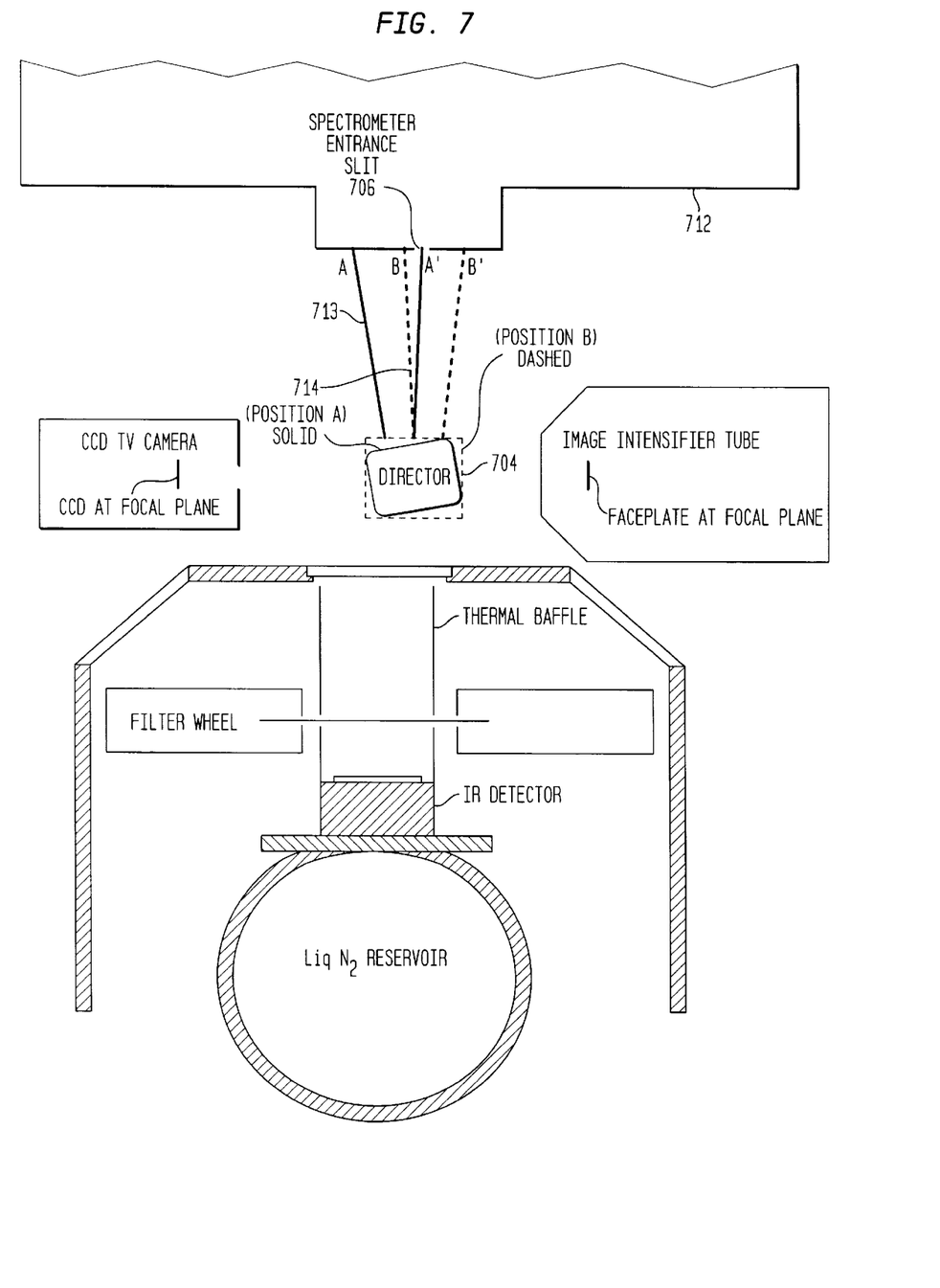
FIG. 7 is an overhead cross-sectional view of a preferred embodiment of the present invention.

FIG. 7 illustrates this novel approach to obtain a two-dimensional image at a desired wavelength. In this novel approach, an image director 704 scans the sample image formed by an objective lens (not shown) across an entrance slit 706 of a scanning spectrometer 712. This eliminates the need for additional scanning apparatus and thereby simplifies the microscope of the present invention. Further, the number of optical surfaces that may come into contact with the sample image may be reduced. Consequently, problems with scattering and absorbing of the sample image may also be reduced.

As shown in FIG. 7, during operation, the image director 704 may rotate from a position A, shown as a solid line, to a position B, shown as a dashed line. By rotating the image director 704, the sample image may be scanned across the entrance slit 706. When the image director 704 is in the position A, the sample image travels over an optical path 713, shown as a solid line. When the image director 704 is in the position B, the sample image travels over an optical path 714, shown as a dashed line. Only the portion of the sample image that is within the bounds of the entrance slit 706 is transmitted to a linear array detector (not shown) of the spectrometer 712. In this way, the horizontal resolution may be provided by mechanically scanning the sample image across the entrance slit of the scanning spectrometer while the vertical resolution of the sample image may be provided in the conventional way (e.g., by the scanning spectrometer and the linear array detector).

In alternate embodiments, a sample positioner may provide the scanning, the objective lens assembly may be scanned or tilted to provide scanning, scanning mirrors may provide scanning, etc.

As shown in FIG. 1 for spectrometer 112, the detector for spectrometer 712 may be selectable by means of a mirror. In an illustrative embodiment, the mirror may select between an IR detector and a CCD detector. The selected image detector may produce an output signal that may be stored and/or viewed through the use of a spectrum capture and storage system such as the spectrum capture and storage system 117 shown in FIG. 1.

Using a direct drive stepper motor to rotate the image director 704 and a 100 $\mu$m wide entrance slit 706, may produce an image with a spatial resolution of better than 100×100 pixels and a wavelength resolution of approximately 1 nm. Some form of image acquisition system, such as the spectrum capture and storage system 117 shown in FIG. 1 may be suitable for this type of imaging due to the very low light levels that may be involved.

The spectrometer of the present invention may be a monochromator. A monochromator is a particular type of spectrometer that is modified to isolate a narrow portion of a received spectrum. The monochromator, like the spectrometer, may have both an IR and visible spectra detectors. The detectors may be selectable by a mirror that is positioned internal or external to the monochromator. An example of a monochromator that uses an internal mirror is an Oriel 1/4 m Monochromator. In a spectrometer that is operating as a monochromator, the CCD detector (e.g., the CCD detector 115 shown in FIG. 1) may be replaced with a photomultiplier tube for visible light spectral analysis of the sample image. Further, the MCT detector (e.g., the MCT detector 114 shown in FIG. 1) may be replaced with a single point MCT detector for IR spectral analysis of the sample image.

Figure 6:
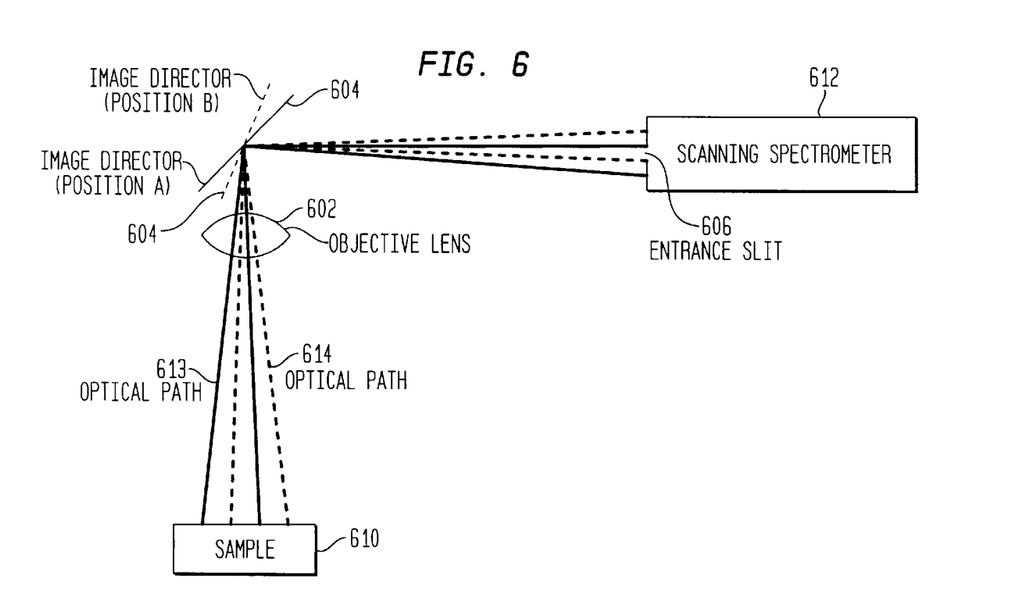
FIG. 6 is a cross-sectional view of a preferred embodiment of the present invention wherein the image director is used to scan the sample image.

A spectrometer with an entrance aperture length shorter than the spectrometer slit may be used to obtain a two-dimensional image by scanning the sample image across the slit in two-dimensions. As shown in FIG. 6 for instance, the scanning may be achieved by rotating an image director 604, to provide scanning in one direction, and then tilting the image director 604 to provide scanning in the orthogonal direction. As shown, the image director 604 may provide scanning of a sample 610 through objective lens 602. To scan the sample 610, the image director 604 may rotate from a position A, shown as a solid line optical path 613, to a position B, shown as a dashed line optical path 614. In this way, the sample image may be scanned across an entrance slit 606 of a scanning spectrometer 612.

In alternate embodiments, two-dimensional scanning may be achieved by moving the sample positioner, by scanning and/or tilting the objective lens assembly, by additional scanning mirrors, etc. In addition, the spectrum capture and storage system 117 shown in shown in FIG. 1 may be used for displaying and/or storing the scanned image.

Returning to FIG. 3, the image director 104 may select the image intensifier camera 102 for conventional photoemission microscopy (PEM) at low light levels. A photocathode 302 of the image intensifier camera 102 may be of the GEN III type. One such image intensifier camera is available from Princeton Instruments. An output signal from the image intensifier camera 102 may be transmitted to the image capture and storage system 101 (see FIG. 1) for storage and/or viewing of the sample image.

The image director 104 may select the IR image detector 103 for IR imaging. A preferred embodiment of the IR image detector 103 may comprise a liquid nitrogen cooled cadmium mercury telluride ("MCT") IR detector array 210 for IR imaging. The IR detector array 210 may preferably use the cooled filter wheel 208. The filter wheel 208 may have several different filters that may be selected by rotating the desired filter into the path of the sample image. The different filters on the filter wheel 208 may typically have different transmission characteristics. Consequently, the filter wheel 208 may be used to remove thermal background radiation and to select the infrared wavelength ranges that are received by the IR detector array 210. The filter selection may be controlled by the system controller 118 (see FIG. 1).

The IR detector array 210 and the filter wheel 208, in this preferred embodiment, are only intended to operate down to 77° Kelvin. Therefore, both the IR detector array 210 and the filter wheel 208 may be mounted on the cooled liquid nitrogen reservoir 211 in the evacuated chamber 209. The evacuated chamber 209 has the window 206 that is transparent to the IR radiation. The thermal radiation baffle 207 is provided to shield the IR detector array 210 from extraneous thermal radiation.

As shown in FIG. 1, an output signal from the IR image detector 103 may be transmitted to the image capture and storage system 101 for storage and/or viewing of the color sample image.

CONCLUSION

Through the use of the spectroscopic microscope of the present invention, different portions of the electromagnetic spectrum of a sample image may be detected under varying conditions using a single microscope. For instance, infrared sample images may be detected by the microscope of the present invention. Visible light sample images may be detected with only incident illumination. The microscope of the present invention may also detect intensified visible light sample images, infrared spectrum sample images, visible spectrum sample images, infrared spectroscopic images and visible light spectroscopic images. In addition, the inventive microscope of the present invention may greatly simplify the procedure required for switching compound lenses and imaging systems by automatically focusing the objective lens assembly in response to a lens selection.

Further, the use of a beam director in the present invention provides a common image path for the sample image and simplifies the setup procedure when switching between the different imaging systems.

While the invention has been described with reference to the preferred embodiments, it will be apparent to those skilled in the art that numerous variations can be made without departing from the spirit or scope of the invention that is defined by the appended claims. For instance, the microscope of the present invention has been described with regard to visible light and infrared imaging. Yet, the CCD camera, photomultiplier tube, objective lens and monochronometer/spectrometer are also suitable for ultraviolet imaging. The preferred embodiments were described above solely for illustrative purposes and were not intended to limit the metes and bounds of the appended claims.

The claimed invention is:

1. A microscope comprising:
   an objective lens for directing a sample image along an image path;
   a plurality of image detectors; and
   a rotatable image director configured to direct the sample image to a selected one of the plurality of image detectors,
   wherein said image path is a common image path between a sample and said image director, said microscope further comprising a filter wheel within said common image path.

2. The microscope of claim 1, wherein one of said plurality of image detectors comprises a visible light image detector and another one of said plurality of image detectors comprises an infrared image detector.

3. A microscope comprising:
   an objective lens for directing a sample image along an image path;
   a plurality of image detectors; and
   a rotatable image director configured to direct the sample image to a selected one of the plurality of image detectors,
   wherein said image path is a common image path between a sample and said image director, said microscope further comprising a chopper within said common image path.

4. The microscope of claim 1, further comprising a stepper motor configured to rotate said image director.

5. The microscope of claim 1, further comprising a system controller configured to control said image director.

6. The microscope of claim 1, further comprising an image capture and storage system configured to receive a signal from one of said plurality of image detectors.

7. The microscope of claim 2, further comprising:
   an illuminator; and
   a mirror, wherein said mirror is configured to provide through-the-lens illumination.

8. The microscope of claim 6, wherein said mirror comprises:
   a half-silvered first portion; and
   a transparent second portion, wherein said microscope is configured to place said half-silvered first portion in said image path when said visible light image detector is selected and said microscope is configured to place said transparent second portion in said image path when said infrared image detector is selected.

9. The microscope of claim 1, wherein one of said plurality of image detectors comprises a spectrometer, said spectrometer comprising an input aperture configured to receive said sample image.

10. The microscope of claim 9, wherein said image director is further configured to provide scanning of said sample image across said input aperture.

11. A method of detecting a sample image comprising the steps of:
    generating said sample image;
    directing said sample image to any one of a plurality of image detectors using a rotatable image director;
    detecting said sample image by said any one of said plurality of image detectors; and
    detecting a source of illumination using a retractable mirror to provide through-the-lens illumination.

12. The method of claim 11, wherein one of said plurality of image detectors is an infrared image detector and another one of said image detectors is a visible light image detector, said method further comprising the steps of:
    positioning a mirror in a first position wherein a first portion of said mirror is placed in the sample image path when said sample image is directed to said visible light image detector; and
    positioning said mirror in a second position wherein a second portion of said mirror is placed in the sample image path when said sample image is directed to said infrared image detector, wherein said first portion of said mirror is a half-silvered portion and said second portion of said mirror is a transparent portion.

13. The method of claim 11, wherein said image detector that receives said sample image is a spectrometer having an input slit, said method further comprising the step of:

scanning said sample image over said input slit.

14. The method of claim 11, wherein said image detector that receives said sample image is a spectrometer having an input square, said method further comprising the step of:

aligning a specific portion of said sample image with said input square.

15. The method of claim 11, further comprising the step of:

controlling said image director using a system controller.

16. The method of claim 11, further comprising the steps of:

producing a signal related to said sample image; and receiving said signal using an image capture and storage system.

17. A method for detecting a sample image using a microscope comprising the steps of:

directing said sample image along a common optical path;

reflecting said sample image to any one of a plurality of image detectors using a rotatable image director; and detecting a source of illumination using a retractable mirror to provide through-the-lens illumination.

18. The method of claim 17, wherein one of said plurality of image detectors is a spectrometer having an input aperture, said method further comprising the steps of:

scanning said sample image across said input aperture in a first direction;

scanning said sample image across said input aperture in a second direction orthogonal to said first direction; and detecting a two-dimensional image.

* * * * *